United States Patent
McDonald et al.

(10) Patent No.: US 9,952,326 B2
(45) Date of Patent: Apr. 24, 2018

(54) SYSTEMS AND METHODS FOR MAINTAINING MINIMUM OPERATIONAL REQUIREMENTS OF A GROUND-BASED AUGMENTATION SYSTEM

(71) Applicant: Honeywell International Inc., Morristown, NJ (US)

(72) Inventors: James Arthur McDonald, Minneapolis, MN (US); Douglas Mark Weed, Forest Lake, MN (US)

(73) Assignee: Honeywell International Inc., Morris Plains, NJ (US)

( * ) Notice: Subject to any disclaimer, the term of this patent is extended or adjusted under 35 U.S.C. 154(b) by 681 days.

(21) Appl. No.: 14/535,126

(22) Filed: Nov. 6, 2014

(65) Prior Publication Data
US 2016/0124092 A1    May 5, 2016

Related U.S. Application Data

(60) Provisional application No. 62/072,175, filed on Oct. 29, 2014.

(51) Int. Cl.
| | |
|---|---|
| *G01S 19/07* | (2010.01) |
| *G01S 19/21* | (2010.01) |
| *G01S 19/41* | (2010.01) |

(52) U.S. Cl.
CPC ............. *G01S 19/07* (2013.01); *G01S 19/21* (2013.01); *G01S 19/41* (2013.01)

(58) Field of Classification Search
CPC ........... G01S 19/07; G01S 19/21; G01S 19/41
USPC ....................................... 342/357.44, 357.59
See application file for complete search history.

(56) References Cited

U.S. PATENT DOCUMENTS

| | | | | |
|---|---|---|---|---|
| 6,813,479 | B2* | 11/2004 | Voyer | H04W 52/24 370/342 |
| 6,826,476 | B2* | 11/2004 | Ahlbrecht | G01S 5/0009 342/357.24 |
| 6,888,498 | B2 | 5/2005 | Brenner | |
| 7,164,383 | B2* | 1/2007 | Fagan | G01S 19/07 342/357.58 |
| 8,094,064 | B2 | 1/2012 | Brenner | |

(Continued)

OTHER PUBLICATIONS

Pullen et al., "The Impact of Uninformed RF Interference on GBAS and Potential Mitigations", at least as early as Jan. 30, 2012, pp. 1-10, downloaded at: http://www-leland.stanford.edu/~spullen/Uninformed RFI to GBAS—Pullen & Gao—ITM 2012 (paper).pdf.

(Continued)

*Primary Examiner* — Chuong P Nguyen
(74) *Attorney, Agent, or Firm* — Fogg & Powers LLC (57) ABSTRACT

A ground-based system to reduce the effect of interference, comprising a plurality of reference receivers, wherein the reference receivers are spaced a distance apart such that a single source of interference is unable to substantially interfere with a subset of the plurality of reference receivers, wherein the subset of the plurality of reference receivers includes at least two reference receivers; and a processing module communicatively coupled to the plurality of reference receivers and configured to receive data from each of the plurality of reference receivers, wherein the processing module is further configured to perform differential calculations on the data to calculate measurement corrections and estimated errors.

23 Claims, 5 Drawing Sheets

(56) References Cited

U.S. PATENT DOCUMENTS

| | | | |
|---|---|---|---|
| 8,976,064 B2* | 3/2015 | Brenner | G01S 19/07 |
| | | | 342/357.24 |
| 9,297,904 B2* | 3/2016 | Scheitlin | G01S 19/15 |
| 2004/0088111 A1 | 5/2004 | Ahlbrecht et al. | |
| 2011/0215965 A1* | 9/2011 | Brenner | G01S 19/08 |
| | | | 342/357.24 |
| 2011/0285586 A1 | 11/2011 | Ferguson | |
| 2015/0219766 A1 | 8/2015 | Weed et al. | |
| 2015/0293230 A1 | 10/2015 | Weed et al. | |
| 2015/0293231 A1 | 10/2015 | Weed et al. | |
| 2017/0223768 A1* | 8/2017 | Jain | H04W 76/046 |

OTHER PUBLICATIONS

Pullen et al., "The Impact of Uninformed RF Interference on GBAS and Potential Mitigations", "International Technical Meeting (ITM) of The Institute of Navigation", Jan. 30, 2012-Feb. 1, 2012, pp. 780-789, Published in: Newport Beach, CA.

Pullen et al., "The Impact of Uniformed RF Interference on GBAS and Potential Mitigations", Jan. 31, 2012, pp. 1-38, Published in: US, downloaded at: http://www-leland.stanford.edu/~spullen/Uninformed RFI to GBAS—Pullen & Gao—ITM 2012 (briefing).pdf.

Pullen et al., "GNSS Jamming in the Name of Privacy: Potential Threat to GPS Aviation", "InsideGNSS", Mar. 4, 2012, pp. 34-43, Publisher: www.insidegnss.com, Published in: US.

Weed et al., "Systems and Methods to Monitor for False Alarms From Ionosphere Gradient Monitors", "U.S. Appl. No. 14/171,569, filed Feb. 3, 2014", Feb. 3, 2014, pp. 1-25, Published in: US.

Weed et al., "Ground Based System and Method to Extend the Direction of Excessive Delay Gradients Using Dual Processing", "U.S. Appl. No. 14/253,431, filed Apr. 15, 2014", Apr. 15, 2014, pp. 1-43, Published in: US.

Weed et al., "Ground-Based System and Method to Extend the Detection of Excessive Delay Gradients Using Parity Corrections", "U.S. Appl. No. 14/253,445, filed Apr. 15, 2014", Apr. 15, 2014, pp. 1-36, Published in: US.

Trinklein, "Post Processing of Multiple GPS Receivers to Enhance Baseline Accuracy", 2011, pp. 1-76, Publisher: Michigan Technological University, Published in: US.

European Patent Office, "Extended European Search Report from EP Application No. 15181634.5 dated Mar. 23, 2016", "From Foreign Counterpart of U.S. Appl. No. 14/535,126", dated Mar. 23, 2016, pp. 1-14, Published in: EP.

Wen et al., "Integrating WAAS Into LAAS to Improve the Integrity of Laas", "Ion GNSS 18th International Technical Meeting of the Satellite Division", Sep. 13-16, 2005, pp. 2855-2860, Publisher: The Institute of Navigation, Published in: US.

European Patent Office, "Communication Pursuant to Article 94(3) EPC for EP Application No. 15181634.5", "from Foreign Counterpart to U.S. Appl. No. 14/535,126", dated Nov. 27, 2017, pp. 1-8, Published in: EP.

Shively et al, "Availability of GAST D GBAS Considering Continuity of Airborne Monitors", "ION 2010 International Technical Meeting", Jan. 25, 2010-Jan. 27, 2010, pp. 365-375, Published in: US.

* cited by examiner

SYSTEMS AND METHODS FOR MAINTAINING MINIMUM OPERATIONAL REQUIREMENTS OF A GROUND-BASED AUGMENTATION SYSTEM

PRIORITY/BENEFIT CLAIM

This patent application claims the benefit of U.S. Provisional Patent Application No. 62/072,175, entitled "SYSTEMS AND METHODS FOR MAINTAINING MINIMUM OPERATIONAL REQUIREMENTS OF A GROUND-BASED AUGMENTATION SYSTEM" filed Oct. 29, 2014, which is hereby incorporated herein by reference.

STATEMENT REGARDING FEDERALLY SPONSORED RESEARCH OR DEVELOPMENT

This invention was made with Government support under Government Contract # DTFACT-10-C-0013 awarded by Federal Aviation Administration, Aircraft Certification Services (AIR-1). The Government has certain rights in the invention.

BACKGROUND

A Ground-Based Augmentation System (GBAS) is used to assist an aircraft when making a precision approach. A GBAS provides measurement corrections and error estimates to the aircraft making a precision approach. A GBAS is sensitive to interference from many sources including GNSS jammers and troposphere gradients.

SUMMARY

A ground-based system to reduce the effect of interference, comprising a plurality of reference receivers, wherein the reference receivers are spaced a distance apart such that a single source of interference is unable to substantially interfere with a subset of the plurality of reference receivers, wherein the subset of the plurality of reference receivers includes at least two reference receivers; and a processing module communicatively coupled to the plurality of reference receivers and configured to receive data from each of the plurality of reference receivers, wherein the processing module is further configured to perform differential calculations on the data to calculate measurement corrections and estimated errors.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Aircraft rely on Global Navigation Satellite System (GNSS) when making precision approaches at an airport. A Category I (CAT-I) precision approach provides guidance to the aircraft until about 200 feet (61 m) above the ground. For Category III (CAT-III) precision approaches, guidance takes the aircraft to the ground and rollout in zero visibility conditions. In order to reach this level of precision, an aircraft's GNSS must be supplemented with measurement corrections, such as those provided by a ground station of a ground-based augmentation system (GBAS). A GBAS that satisfies the requirements for GBAS Approach Service Type C (GAST-C) will support landings to CAT-I minimum requirements. A GBAS that satisfies the requirements for GBAS Approach Service Type D (GAST-D) GBAS will support landings to CAT-III minimum requirements.

Global Navigation Satellite Systems (GNSS) described herein include the United States' Global Positioning System (GPS), Russia's Global'naya Navigatsionnaya Sputnikovaya Sisterna (GLONASS), China's Beidou (Compass), the European Union's Galileo, France's Doppler Orbitography and Radio-positioning Integrated by Satellite (DORIS), India's Indian Regional Navigational Satellite System (IRNSS), and Japan's Quasi-Zenith Satellite System (QZSS).

Ground stations are susceptible to interference that affects continuity, integrity, and availability of the system. For example, excessive radio frequency interference which jams the GNSS signal can be one source of interference. GNSS jamming can be produced by a single source device and causes elevated noise levels in a GNSS. The ground station monitors are configured to account for a normal amount of noise. However, the radio frequency interference from a GNSS jamming device can result in blinding some of the ground station monitors (where a monitor does not detect an error source) and/or false alerts to be issued by the ground station due to elevated noise or error in the system. This reduces the continuity, integrity, and availability of ground stations.

One of the largest sources of error for a GNSS receiver is caused by anomalous delay gradients. Anomalous delay gradients are in the ionosphere and affect the phase of the radio frequency signals that propagate through the anomalous delay gradient. The anomalous delay gradients are caused by extreme changes in electron density of the ionosphere. The delay gradient can result in spatially decorrelated errors between a GBAS ground station producing differential corrections and an aircraft using those corrections. This spatially decorrelated error can result in unacceptably large position errors for an aircraft performing a precision approach.

To account for ionosphere gradients, ground stations include an ionosphere gradient monitor (IGM) to detect and estimate the magnitude of ionosphere gradients. If the estimated magnitude surpasses a selected threshold, then the IGM issues an alert and excludes the satellite that provided the affected signal from providing navigation system data to an aircraft.

Delay gradients in the troposphere can also interfere with the ground station in a similar way to GNSS jamming. Troposphere gradients are not as spatially large (typically less than 1 kilometer) or severe as ionosphere gradients. The troposphere gradients are not large enough to produce as large of an error in comparison to ionosphere gradients, but troposphere gradients can result in blinding of the IGM's detection capability and/or false alerts to be issued by the IGM due to elevated noise or error in the system. This reduces the continuity, integrity, and availability performance of ground stations in a manner similar to GNSS jamming.

The embodiments described below provide methods and systems for operating a ground-based GNSS augmentation system such that minimum operational requirements can consistently be maintained. The embodiments described below reduce the effect of noise on a ground-based system and improve the continuity, integrity, and availability performance of a ground station of the ground-based system.

Figure 1:
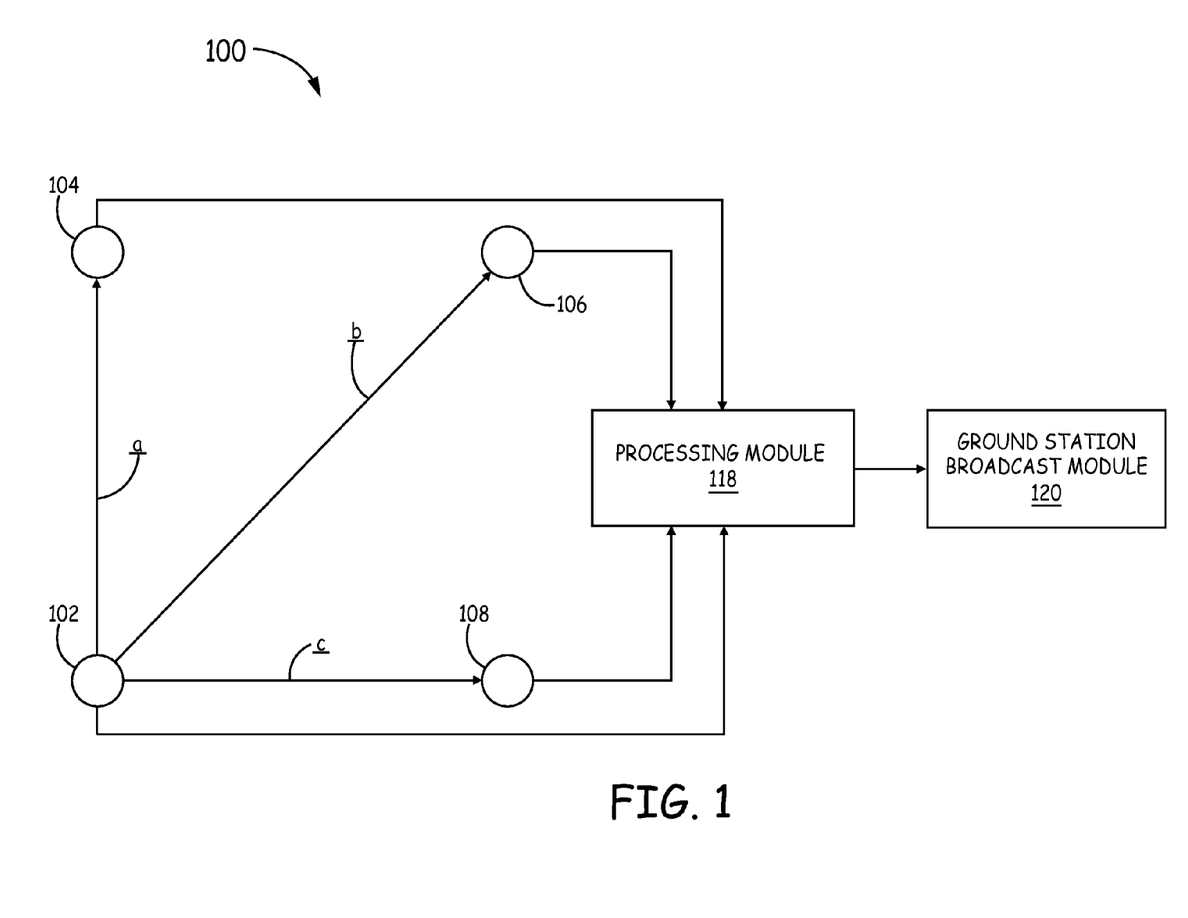
FIG. 1 is a block diagram illustrating a ground station of one embodiment of the present disclosure.

FIG. 1 illustrates an example ground station 100 of one embodiment of the present disclosure. More specifically, FIG. 1 is a block diagram illustrating ground station 100. In exemplary embodiments, the ground station 100 is a GBAS ground station. Although the ground station 100 described herein is for an airport landing system, this invention can be implemented in systems that require accurate input from a global position system satellite and is not limited for use with aircraft and/or ground stations for aircraft.

As shown in FIG. 1, ground station 100 includes a plurality of reference receivers 102, 104, 106, 108, a processing module 118, and a ground station broadcast module 120. The reference receivers 102, 104, 106, 108 are ground reference receivers. As is understood, each reference receiver 102, 104, 106, 108 is a radio frequency receiver with an antenna. During operation, the reference receivers 102, 104, 106, 108 receive radio frequency signals from satellites. The reference receivers 102, 104, 106, 108 are communicatively coupled to the processing module 118 through a wired or wireless link.

The reference receivers 102, 104, 106, 108 have a known geometric relationship to one another. In exemplary embodiments, the reference receivers 102, 104, 106, 108 are organized into pairs, including: a first pair, a second pair, and a third pair. In exemplary embodiments, the first pair includes reference receivers 102 and 104. In exemplary embodiments, the second pair includes reference receivers 102 and 106. In exemplary embodiments, the third pair includes reference receivers 102 and 108. Reference receivers 104, 106, 108 have a known difference-in-position versus the reference receiver 102 that is common to the first pair, the second pair, and the third pair. For example, vector a is the known difference-in-position of the reference receivers 102 and 104, vector b is the known difference-in-position of the reference receivers 102 and 106, and vector c is the known difference-in-position of the reference receivers 102 and 108. The known difference-in-position can be two-dimensional or three-dimensional.

The reference receivers 102, 104, 106, 108 are spaced apart a known distance from one another. In exemplary embodiments, the reference receivers 102, 104, 106, 108 are spaced apart such that a single source of interference is unable to substantially affect a subset of the plurality of reference receivers. In exemplary embodiments, the subset of the plurality of reference receivers includes at least two reference receivers. In exemplary embodiments, the subset of the plurality of reference receivers includes an amount such that the ground station 100 is able to consistently maintain minimum operational requirements if a single source of interference interferes with the ground station 100. In exemplary embodiments, a single source of interference includes a radio frequency interference device or a troposphere gradient. In exemplary embodiments, the effective distance of the single source of interference is one to three kilometers. In exemplary embodiments, the distance between each reference receiver 102, 104, 106, 108 is between one to three kilometers, such that the distance is beyond the effective distance of the single source of interference.

The minimum operational requirements for ground station 100 vary depending on the type of approach that is required. In exemplary embodiments, minimum operational requirements are met if two reference receivers are available. For GAST-C implementations, minimum operational requirements are met if three reference receivers are available. For GAST-D implementations, minimum operational requirements are met if four reference receivers are available. The ground station 100, including four reference receivers 102, 104, 106, 108, can satisfy the minimum operational requirements for GAST-C implementations because the reference receivers 102, 104, 106, 108, are spaced apart far enough to mitigate a single source of interference.

In operation, the minimum operational requirements can be met using different combinations of the reference receivers 102, 104, 106, 108. For example, for GAST-C implementations, a single source of interference could produce noise on reference receiver 102 so it becomes invalid. In this case, the minimum operational requirements for GAST-C would be met using reference receivers 104, 106, 108. It is to be understood that any permutation of three of the reference receivers 102, 104, 106, 108, can be used to satisfy the minimum operational requirements.

While only four reference receivers are shown in FIG. 1, it is to be understood that ground station 100 can include greater than four reference receivers. In exemplary embodiments, ground station 100 includes five or more reference receivers. In exemplary embodiments, the five or more reference receivers are spaced apart such the ground station 100 is able to consistently maintain minimum operational requirements if a single source of interference interferes with the ground station 100. In exemplary embodiments, a ground station having five or more reference receivers can maintain the minimum operational requirements for GAST-D implementations because the five or more reference receivers are spaced apart far enough to mitigate a single source of interference.

Figure 2:
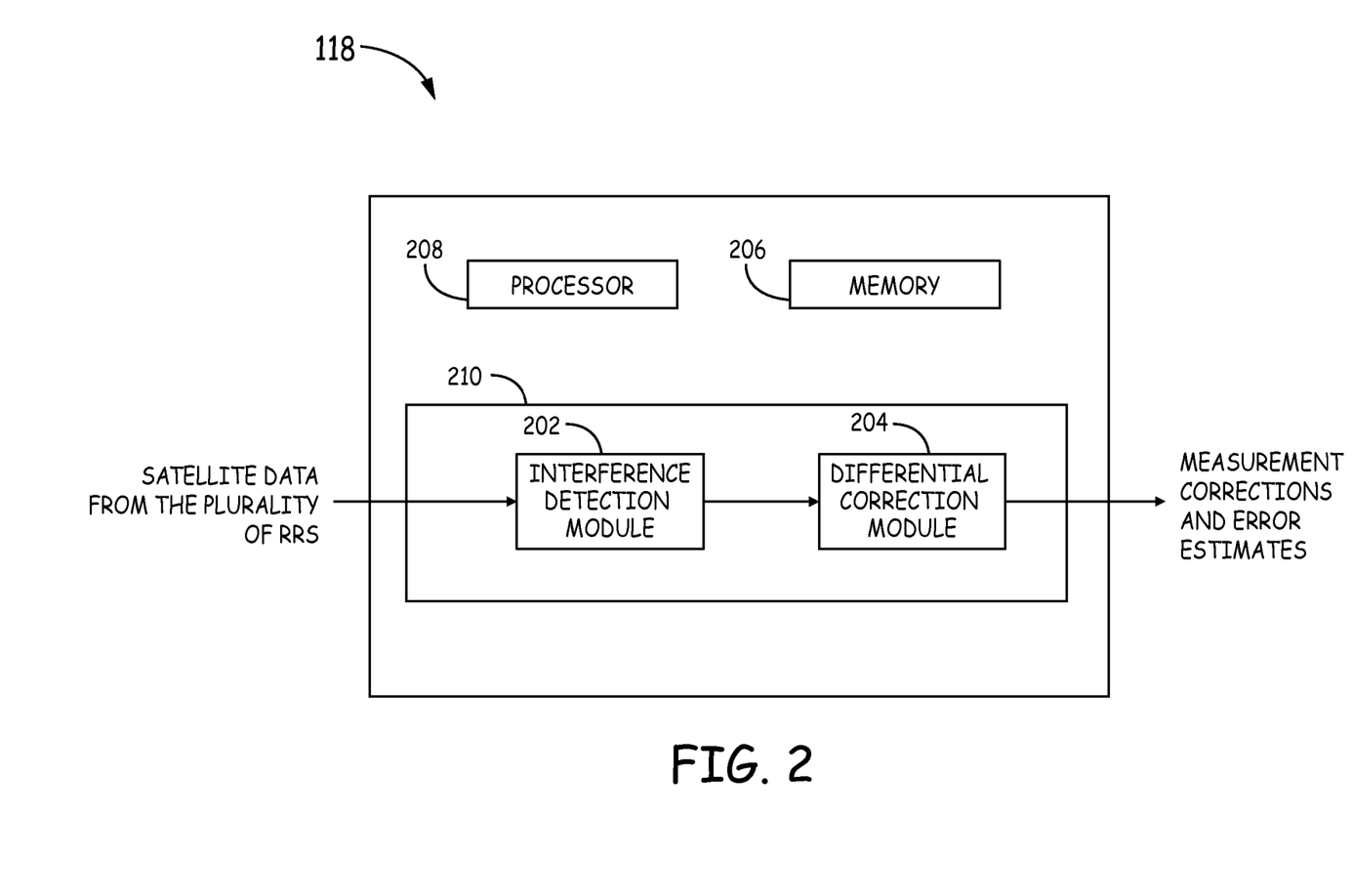
FIG. 2 is a block diagram illustrating an example processing module of one embodiment of the present disclosure.

FIG. 2 illustrates an example processing module 118 of one embodiment of the present disclosure. The processing module 118 includes an interference detection module 202, a differential correction module 204, a memory 206, at least one processor 208, and a storage medium 210. The interference detection module 202 is communicatively coupled to provide input to the differential correction module 204. The at least one processor 208 is communicatively coupled to the interference detection module 202 and the differential correction module 204. In exemplary embodiments, the interference detection module 202 and the differential correction module 204 are implemented using computer executable instructions stored on the storage medium 210. In exemplary embodiments, the functionality of the interference detection module 202 and the differential correction module 204 is executed by a processing device, such as processor 208. In exemplary embodiments, the interference detection module 202 and the differential correction module 204 are the same module. An example differential correction module is described in U.S. Pat. No. 8,094,064 entitled "Ground-Based System and Method to Monitor for Excessive Delay Gradients", herein incorporated by reference in its entirety and referred to herein as "the '064 patent".

Processing module 118 and/or processor 208 includes or functions with software programs, firmware or other computer readable instructions for carrying out various methods, process tasks, calculations, and control functions, used in the ground station. These instructions are typically stored on any appropriate computer readable medium used for storage of computer readable instructions or data structures, such as the storage medium 210. The computer readable medium, such as the storage medium 210, can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, processor 208 comprises microprocessors or microcontrollers. Moreover, although the processor 208 and the memory 206 are shown as separate elements in FIG. 2, in exemplary embodiments, the processor 208 and memory 206 are implemented in a single device (for example, a single integrated-circuit device). In exemplary embodiments, the processor 208 comprises processor support chips and/or system support chips such as application-specific integrated circuits (ASICs).

Figure 3:
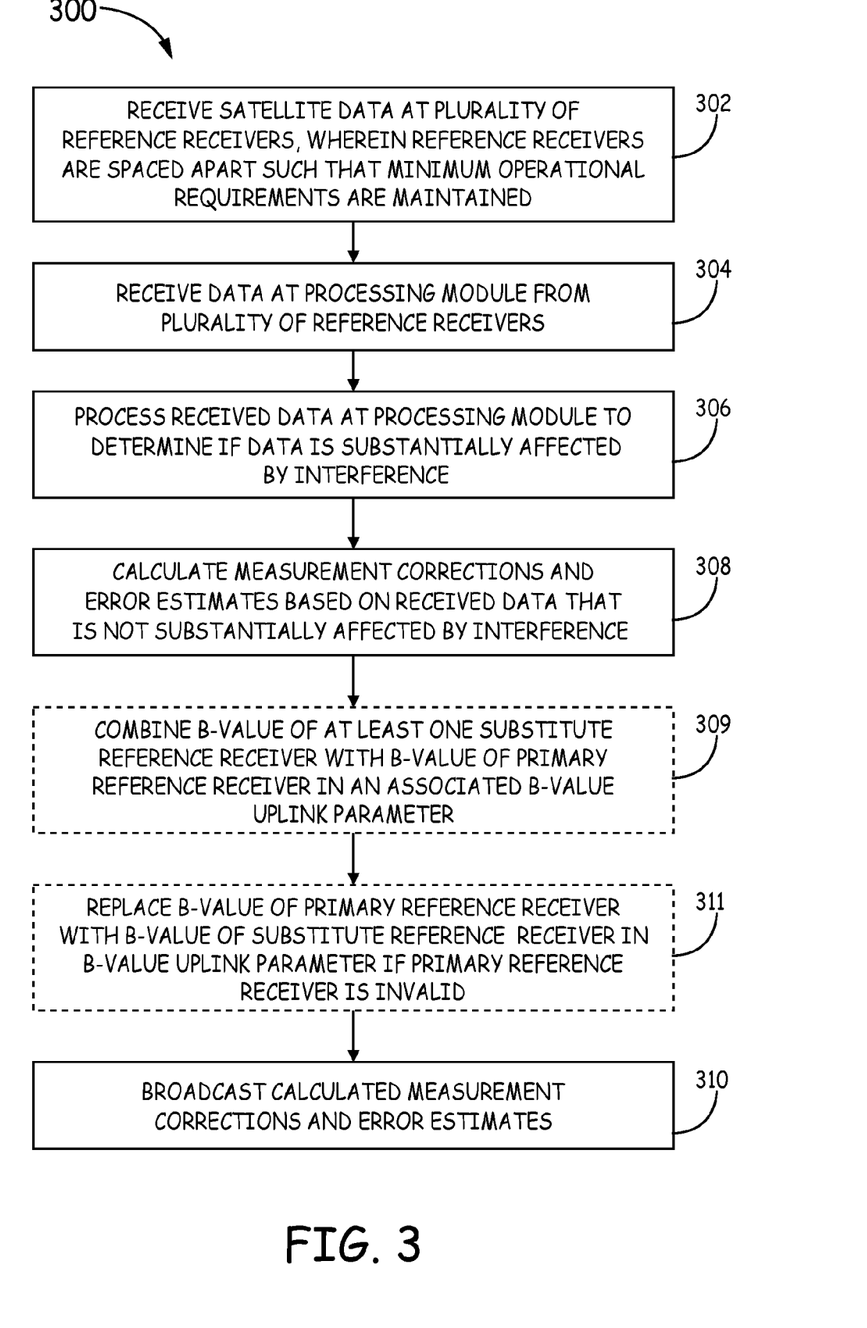
FIG. 3 is a flow chart illustrating a method of reducing the effect of interference on a ground-based system according to one embodiment of the present disclosure.

FIG. 3 is a flow chart illustrating an exemplary method of reducing the effect of interference on a ground-based system according to one embodiment of the present disclosure. The method begins at 302 with receiving satellite data at a plurality of reference receivers. The plurality of reference receivers receive radio frequency signals from multiple satellites at approximately the same time as each other. The signals include pseudorandom code specific to each satellite and/or some other data received by the reference receivers used to identify the satellite.

In exemplary embodiments, the plurality of reference receivers includes four or more reference receivers. In exemplary embodiments, the plurality of reference receivers are spaced apart such that a single source of interference is unable to substantially interfere with a subset of the plurality of reference receivers. In exemplary embodiments, the subset of the plurality of reference receivers includes at least two reference receivers. In exemplary embodiments, the subset of the plurality of reference receivers includes an amount of reference receivers such that the ground station is able to consistently maintain minimum operational requirements if a single source of interference interferes with one or more reference receivers at the ground station. In exemplary embodiments, the minimum operational requirements of the ground station are satisfied using two, three, or four reference receivers.

The method proceeds to 304 with receiving data at a processing module from the plurality of reference receivers. The data includes carrier phase measurements from the reference receivers. The carrier phase measurements are an instant readout of a register of numbers indicative of the instant carrier phase angle of the satellite radio frequency signals. Each reference receiver maintains a separate register and sends carrier phase measurements to the processing module.

The method proceeds to 306 with processing the received data at the processing module to detect whether the data from the plurality of reference receivers is substantially affected by interference. All data from the reference receivers has some noise (i.e. multipath), but interference caused by a radio frequency interference device or troposphere gradient is much more substantial. In exemplary embodiments, the processing module determines the amount of noise on the data from each of the reference receivers and whether that amount exceeds an individual threshold. If the noise level on a reference receiver exceeds the individual threshold, then that reference receiver is substantially affected by interference. The noise levels on the data from the plurality of reference receivers are also compared to each other in order to determine whether one is being affected by interference. If the noise levels are within a threshold range of each other, then it is determined that the reference receivers are not substantially affected by interference. If the variation in the noise on the data from the reference receivers exceeds the threshold range, then it is determined that interference is substantially affecting at least one of the reference receivers. The data from the reference receivers that are substantially affected by interference is excluded from further use by the processing module or mitigated.

The method proceeds to 308 with calculating measurement corrections and error estimates, with the processing module, based on the data that is not substantially affected by interference. The calculation by the processing module includes generating differential corrections and protecting the integrity of the corrections.

In exemplary embodiments for GAST-D implementations, the calculation by the processing module further includes performing differencing, double differencing, averaging, and estimating the magnitude of a horizontal delay gradient. As described in the '064 patent and generally summarized herein, the calculation includes determining differences in the carrier phase measurements between the signals from the different satellites. The calculation includes forming double differences between pairs of the reference receivers. The double difference are then averaged and compensated (including modulo operation). The processing module estimates a magnitude of the horizontal delay gradient resulting from a gradient in the ionosphere.

The method proceeds to 310 with broadcasting the calculated measurement corrections and error estimates. In exemplary embodiments, the calculated measurement corrections and error estimates are transferred to a ground station broadcast module via wired or wireless connection. The measurement corrections and error estimates are then externally broadcast via the ground station broadcast module. In exemplary embodiments, the broadcast is via a very high frequency (VHF) antenna. In exemplary embodiments, the broadcast is received by a vehicle.

GBAS supports only four B-value uplink parameters for external broadcast. Therefore, for a GBAS ground station with more than four reference receivers, such as certain embodiments of ground station 100, there are not enough uplink parameters to externally broadcast the data corresponding to all the reference receivers individually. In exemplary embodiments, this data corresponding to all the reference receivers is maintained internally within the processing module 118. In exemplary embodiments, multiple reference receivers can be combined in a single B-value uplink parameter. In exemplary embodiments, two reference receivers are combined into a single B-value uplink parameter (optional block 309). In exemplary embodiments, more than two reference receivers are combined into a single B-value uplink parameter. The combination of reference receivers into a single B-value uplink parameter further reduces the effect of noise on the ground-based system.

In exemplary embodiments, a ground station with more than four reference receivers, such as certain embodiments of ground station 100, can utilize some of the reference receivers as substitute reference receivers. In exemplary embodiments, four reference receivers would be designated as primary reference receivers and the additional reference receivers would be designated as substitute reference receivers. The B-values from the four primary reference receivers are used for broadcast. In the event of an invalid primary reference receiver, the B-value from one of the substitute reference receivers would be substituted into the uplink parameter for the invalid primary reference receiver (optional block 311). A primary reference receiver can be invalid due to radio frequency interference or a B-value fault. In exemplary embodiments, the substitute reference receiver B-values are only used when a primary reference receiver is invalid.

Figure 4:
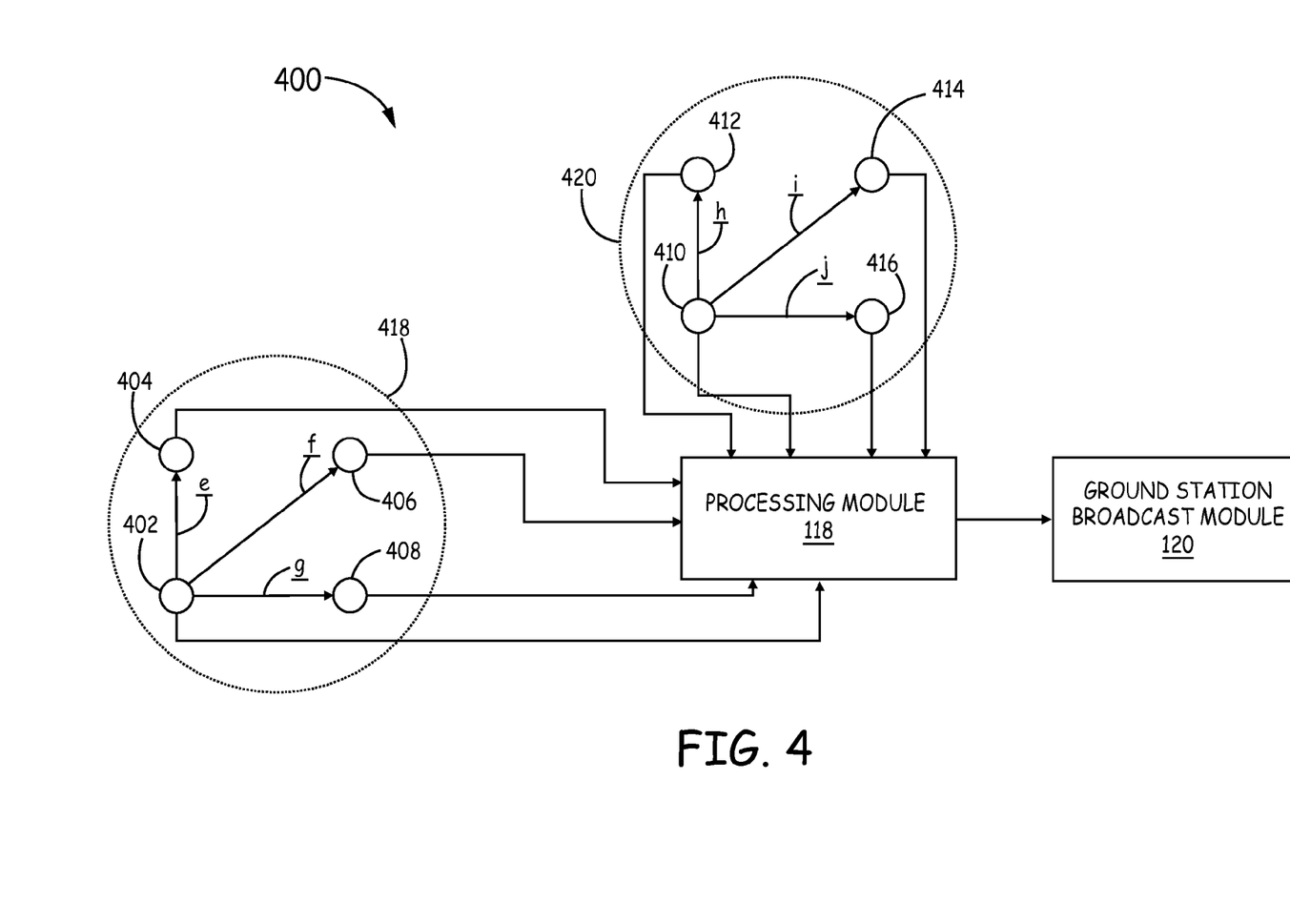
FIG. 4 is a block diagram illustrating a ground station of one embodiment of the present disclosure.

FIG. 4 illustrates another example ground station 400 of one embodiment of the present disclosure. Ground station 400 includes a first plurality of reference receivers 418, including reference receivers 402, 404, 406, 408; a second plurality of reference receivers 420, including reference receivers 410, 412, 414, 416; a processing module 118; and a ground station broadcast module 120. The reference receivers 402, 404, 406, 408, 410, 412, 414, 416 are communicatively coupled to the processing module 118 through a wired or wireless link.

While FIG. 4 shows each plurality including four reference receivers, it is to be understood that this is for illustration and the ground station 400 can include three or more reference receivers in a plurality of reference receivers. Also, while FIG. 4 shows two pluralities of reference receivers, it is to be understood that this is for illustration and the ground station 400 can include two or more pluralities of reference receivers. In exemplary embodiments, each of the first and second pluralities of reference receivers 418, 420 are individually capable of maintaining minimum operational requirements for a GAST-C GBAS or GAST-D GBAS.

The first plurality of reference receivers 418 and the second plurality of reference receivers 420 are spaced apart a known distance from one another. In exemplary embodiments, the first plurality of reference receivers 418 and the second plurality of reference receivers 420 are spaced apart such that minimum operational requirements can be consistently maintained if a single source of interference interferes with the ground-based system. In exemplary embodiments, a single source of interference includes a radio frequency interference device or a troposphere gradient. In exemplary embodiments, the effective distance of the single source of interference is one to three kilometers. In exemplary embodiments, the distance between each plurality of reference receivers is between one to three kilometers, such that the distance is beyond the effective distance of the single source of interference.

The reference receivers 402, 404, 406, 408 have a known geometric relationship to one another. The known geometric relationship between the reference receivers 402, 404, 406, 408 in the first plurality of reference receivers 418 is indicated by: vector e from a first reference receiver 402 to a second reference receiver 404, vector f from the first reference receiver 402 to a third reference receiver 406, and vector g from the first reference receiver 402 to a fourth reference receiver 408. In exemplary embodiments, the reference receivers 402, 404, 406, 408 are organized into pairs, including: a first pair, a second pair, and a third pair. In exemplary embodiments, the first pair includes reference receivers 402 and 404. In exemplary embodiments, the second pair includes reference receivers 402 and 406. In exemplary embodiments, the third pair includes reference receivers 402 and 408. Reference receivers 404, 406, 408 have a known difference-in-position versus the reference receiver 402 that is common to the first pair, the second pair, and the third pair. For example, vector e is the known difference-in-position of the reference receivers 402 and 404, vector f is the known difference-in-position of the reference receivers 402 and 406, and vector g is the known difference-in-position of the reference receivers 402 and 408. The known difference-in-position can be two-dimensional or three-dimensional.

The reference receivers 410, 412, 414, 416 have a known geometric relationship to one another. The known geometric relationship between the reference receivers 410, 412, 414, 416 in the second plurality of reference receivers 420 is indicated by: vector h from a first reference receiver 410 to a second reference receiver 412, vector i from the first reference receiver 402 to a third reference receiver 414, and vector j from the first reference receiver 410 to a fourth reference receiver 416. In exemplary embodiments, the reference receivers 410, 412, 414, 416 are organized into pairs, including: a fourth pair, a fifth pair, and a sixth pair. In exemplary embodiments, the fourth pair includes reference receivers 410 and 412. In exemplary embodiments, the fifth pair includes reference receivers 410 and 414. In exemplary embodiments, the sixth pair includes reference receivers 410 and 416. Reference receivers 412, 414, 416 have a known difference-in-position versus the reference receiver 410 that is common to the fourth pair, the fifth pair, and the sixth pair. For example, vector h is the known difference-in-position of the reference receivers 410 and 412, vector i is the known difference-in-position of the reference receivers 410 and 414, and vector j is the known difference-in-position of the reference receivers 410 and 416. The known difference-in-position can be two-dimensional or three-dimensional.

The operation of the processing module 118 for ground station 400 is similar to that as discussed above with respect to FIGS. 1-3.

Figure 5:
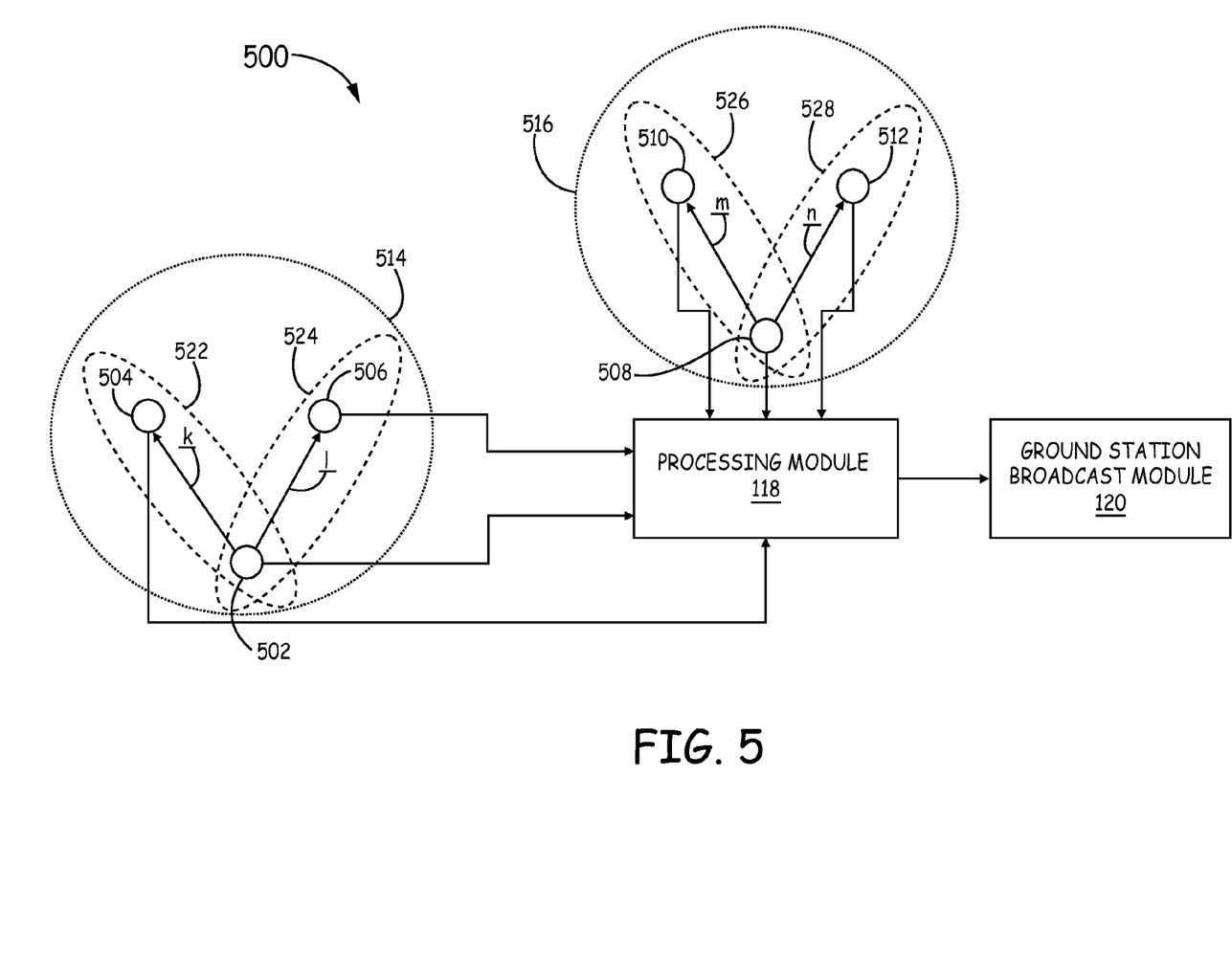
FIG. 5 is a block diagram illustrating a ground station of one embodiment of the present disclosure.

FIG. 5 illustrates an example ground station 500 of one embodiment of the present disclosure. More specifically, FIG. 5 is a block diagram illustrating a variation of ground station 100. As shown in FIG. 5, ground station 500 includes a first plurality of reference receivers 514 including reference receivers 502, 504, 506; a second plurality of reference receivers 516 including reference receivers 508, 510, 512; a processing module 118; and a ground station broadcast module 120. The embodiment shown in FIG. 5 includes three reference receivers 502, 504, 506 in the first plurality of reference receivers 514 and three reference receivers 508, 510, 512 in the second plurality of reference receivers 516.

While FIG. 5 shows pluralities of three reference receivers, it is to be understood that this is for illustration and the ground station 500 can include three or more reference receivers in each plurality of reference receivers. For example, the first plurality of reference receivers 514 and the second plurality of reference receivers 516 in the ground station 500 can include four or six reference receivers. Also, while FIG. 5 shows two pluralities of reference receivers, it is to be understood that this is for illustration and the ground station 500 can include two or more pluralities of reference receivers. In exemplary embodiments, each of the first and second pluralities of reference receivers 514, 516 are individually capable of maintaining minimum operational requirements for a GAST-C GBAS in the presence of a single source of interference.

The first plurality of reference receivers 514 and the second plurality of reference receivers 516 are spaced apart a known distance from one another. In exemplary embodiments, the first plurality of reference receivers 514 and the second plurality of reference receivers 516 are spaced apart such that the ground station can consistently maintain minimum operational requirements if a single source of interference interferes with the ground-based system. In exemplary embodiments, a single source of interference includes a radio frequency interference device or a troposphere gradient. In exemplary embodiments, the effective distance of the single source of interference is one to three kilometers. In exemplary embodiments, the distance between each plurality of reference receivers is between one to three kilometers, such that the distance is beyond the effective distance of the single source of interference.

The reference receivers 502, 504, 506 of the first plurality of reference receivers 514 are ground reference receivers. As is understood, each reference receiver 502, 504, 506 is a radio frequency receiver with an antenna. During operation, the reference receivers 502, 504, 506 receive radio frequency signals from satellites. The reference receivers 502, 504, 506 are communicatively coupled to the processing module 118 through a wired or wireless link. The reference receivers 502, 504, 506 have a known geometric relationship to one another.

The known geometric relationship between the reference receivers 502, 504, 506 is indicated by: vector a from a first reference receiver 502 to a second reference receiver 504 and vector b from the first reference receiver 502 to a third reference receiver 506. In exemplary embodiments, the reference receivers 502, 504, 506 are organized into a first pair 522 and a second pair 524. In exemplary embodiments, the first pair 522 includes reference receivers 502 and 504. In exemplary embodiments, the second pair 524 includes reference receivers 502 and 506. Reference receivers 504, 506 have a known difference-in-position versus the reference receiver 502 that is common to the first pair 522 and the second pair 524. For example, vector k is the known difference-in-position of the reference receivers 502 and 504, and vector k is the known difference-in-position of the reference receivers 502 and 506. The known difference-in-position can be two-dimensional or three-dimensional.

The reference receivers 508, 510, 512 of the second plurality of reference receivers 516 are ground reference receivers. Each reference receiver 508, 510, 512 is a radio frequency receiver with an antenna. During operation, the reference receivers 508, 510, 512 also receive radio frequency signals from satellites. The reference receivers 508, 510, 512 are communicatively coupled to the processing module 518 through a wired or wireless link. The reference receivers 508, 510, 512 have a known geometric relationship to one another.

The known geometric relationship between the reference receivers 508, 510, 512 is indicated by: vector l from a first reference receiver 508 to a second reference receiver 510 and vector m from the first reference receiver 508 to a third reference receiver 512. In exemplary embodiments, the reference receivers 508, 510, 512 are organized into pairs. In exemplary embodiments, the third pair 526 includes reference receivers 508 and 510. In exemplary embodiments, the fourth pair 528 includes reference receivers 508 and 512. Reference receivers 510, 512 have a known difference-in-position versus the reference receiver 508 that is common to the third pair 526 and the fourth pair 528. For example, vector c is the known difference-in-position of the reference receivers 508 and 510, and vector d is the known difference-in-position of the reference receivers 508 and 512. The known difference-in-position can be two-dimensional or three-dimensional.

The operation of the processing module 118 for ground station 500 is similar to that as discussed above with respect to FIGS. 1-3.

The above identified systems and methods provide numerous benefits. For example, the use of at least two pluralities of reference receivers provides reduced error on the calculated measurement corrections because the double differencing produces better averages. This provides more accurate information to a vehicle using the ground station to enhance its GNSS system. For aircraft, this results in a smaller vertical protection limit.

As discussed above, the presence of interference can disrupt the operation of a ground station, such that detection of ionosphere gradients is unreliable. This can result in false alerts or blinding the detection capability of the ionosphere gradient monitor. In example embodiments of the ground station discussed above, the reference receivers are spaced apart such that the system can maintain minimum operational requirements for GAST-C and GAST-D systems when a single source of interference interferes with the system. By implementing a ground station with reference receivers spaced apart in this manner, it is possible to reduce the effect of interference on the ground station and consistently maintain minimum operational requirements. Thus, the above systems and methods enhance the continuity, availability, and integrity performance of the ground-based system.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a ground-based system to reduce the effect of interference, comprising: a plurality of reference receivers, wherein the reference receivers are spaced a distance apart such that a single source of interference is unable to substantially interfere with a subset of the plurality of reference receivers, wherein the subset of the plurality of reference receivers includes at least two reference receivers; and a processing module communicatively coupled to the plurality of reference receivers and configured to receive data from each of the plurality of reference receivers, wherein the processing module is further configured to perform differential calculations on the data to calculate measurement corrections and estimated errors.

Example 2 includes the system of Example 1, wherein the processing module is further configured to exclude data from a particular reference receiver from the plurality of reference receivers if it is determined that the data from the particular reference receiver is substantially affected by interference.

Example 3 includes the system of any of Examples 1-2, wherein the plurality of reference receivers includes at least four reference receivers.

Example 4 includes the system of any of Examples 1-3, wherein the plurality of reference receivers includes more than four reference receivers; wherein four reference receivers of the more than four reference receivers are primary reference receivers; and wherein any additional reference receivers are substitute reference receivers.

Example 5 includes the system of Example 4, wherein a B-value uplink parameter is associated with the primary reference receivers; and wherein at least one of the substitute reference receivers is combined with a primary reference receiver in a B-value uplink parameter.

Example 6 includes the system of any of Examples 4-5, wherein a particular primary reference receiver is replaced with a substitute reference receiver in a B-value uplink parameter if the particular primary reference receiver is invalid.

Example 7 includes the system of any of Examples 1-6, wherein the plurality of reference receivers includes a first plurality of reference receivers and a second plurality of reference receivers; wherein the first plurality of reference receivers includes at least three reference receivers; and wherein the second plurality of reference receivers includes at least three reference receivers.

Example 8 includes the system of Example 7, wherein the processing module is configured to operate the system with data from only one of the first plurality of reference receivers and the second plurality of reference receivers.

Example 9 includes the system of any of Examples 7-8, wherein the first plurality of reference receivers is spaced between one and three kilometers from the second plurality of reference receivers.

Example 10 includes the system of any of Examples 1-9, further comprising a broadcast module configured to broadcast the measurement corrections and the estimated errors.

Example 11 includes a method for reducing the effect of interference on a Ground-Based Augmentation System (GBAS), the method comprising: receiving satellite data at a plurality of reference receivers, wherein the reference receivers are spaced a distance apart such that the such that a single source of interference is unable to substantially interfere with a subset of the plurality of reference receivers, wherein the subset of the plurality of reference receivers includes at least two reference receivers; receiving data at a processing module from the plurality of reference receivers; processing the data at the processing module to determine if the data is substantially affected by interference; and calculating measurement corrections and error estimates based on the data that is not substantially affected by interference.

Example 12 includes the method of Example 11, further comprising excluding data from a particular reference receiver of the plurality of reference receivers if it is determined that the data from the particular reference receiver is substantially affected by interference.

Example 13 includes the method of any of Examples 11-12, wherein the plurality of reference receivers includes at least four reference receivers.

Example 14 includes the method of any of Examples 11-13, wherein the plurality of reference receivers includes more than four reference receivers; wherein four reference receivers of the more than four reference receivers are primary reference receivers; and wherein any additional reference receivers are substitute reference receivers.

Example 15 includes the method of Example 14, further comprising combining at least one of the substitute reference receivers with a primary reference receiver in a B-value uplink parameter, wherein a B-value uplink parameter is associated with the primary reference receivers.

Example 16 includes the method of any of Examples 14-15, further comprising replacing a particular primary reference receiver with a substitute reference receiver in a B-value uplink parameter if the particular primary reference receiver is invalid.

Example 17 includes the method of Example 16, further comprising reevaluating whether the particular reference receiver is invalid after a specified time.

Example 18 includes the method of any of Examples 11-17, wherein the plurality of reference receivers includes a first plurality of reference receivers and a second plurality of reference receivers; wherein the first plurality of reference receivers includes at least three reference receivers; and wherein the second plurality of reference receivers includes at least three reference receivers.

Example 19 includes the method of any of Examples 17-18, wherein the first plurality of reference receivers is spaced between one and three kilometers from the second plurality of reference receivers.

Example 20 includes the method of any of Examples 11-19, further comprising broadcasting the calculated measurement corrections and error estimates.

Example 21 includes a processing module, comprising: a memory; a storage medium; and an interference detection module, wherein the interference detection module is configured to: receive data from a plurality of reference receivers, wherein the reference receivers are spaced a distance apart such that a single source of interference is unable to substantially interfere with a subset of the plurality of reference receivers, wherein the subset of the plurality of reference receivers includes at least two reference receivers; and process the data to determine if the data is substantially affected by interference; a differential correction module, wherein the differential correction module is communicatively coupled to the interference detection module, wherein the differential correction module is configured to calculate measurement corrections and error estimates based on the data that is not substantially affected by interference.

Example 22 includes the processing module of Example 21, wherein the plurality of reference receivers includes more than four reference receivers; wherein four reference receivers of the four or more reference receivers are primary reference receivers having an associated B-value uplink parameter; and wherein any additional reference receivers are substitute reference receivers.

Example 23 includes the processing module of Example 22, wherein the processing module is further configured to combine at least one substitute reference receiver with a primary reference receiver in a B-value uplink parameter.

What is claimed is:

1. A ground-based system to reduce the effect of interference, comprising:
   a plurality of reference receivers, wherein the plurality of reference receivers includes a first subset of reference receivers and a second subset of reference receivers, wherein the first subset of reference receivers are primary reference receivers, wherein a B-value uplink parameter is associated with each of the primary reference receivers, wherein the first subset of reference receivers includes two or more reference receivers, wherein the second subset of reference receivers are substitute reference receivers, wherein the second subset of reference receivers includes at least one reference receiver; and
   a processing module communicatively coupled to the plurality of reference receivers and configured to receive data from each of the plurality of reference receivers, wherein the processing module is further configured to perform differential calculations on the data to calculate measurement corrections and estimated errors, wherein the processing module is further configured to perform at least one of:
      combining a B-value of a first substitute reference receiver of the second subset of reference receivers with the B-value of a first primary reference receiver of the first subset of reference receivers in an associated B-value uplink parameter of the first primary reference receiver; and
      replacing the B-value of a particular primary reference receiver of the first subset of reference receivers with a B-value from a substitute reference receiver of the second subset of reference receivers in a B-value uplink parameter if the particular primary reference receiver is invalid.

2. The system of claim 1, wherein each of the plurality of reference receivers are spaced a distance apart such that a single source of interference is unable to substantially interfere with two or more reference receivers simultaneously.

3. The system of claim 2, wherein each of the plurality of reference receivers are spaced between one and three kilometers apart.

4. The system of claim 1, wherein the processing module is further configured to exclude data from a reference receiver of the plurality of reference receivers if it is determined that the data from the reference receiver is substantially affected by interference.

5. The system of claim 4, wherein the data from the reference receiver is substantially affected by interference if noise levels on the data exceed a threshold.

6. The system of claim 1, wherein the first subset of reference receivers includes four reference receivers.

7. The system of claim 1, wherein the plurality of reference receivers includes a first plurality of reference receivers and a second plurality of reference receivers;
   wherein the first plurality of reference receivers includes at least three reference receivers;
   wherein the second plurality of reference receivers includes at least three reference receivers; and
   wherein the first plurality of reference receivers and the second plurality of reference receivers are spaced a distance apart such that a single source of interference is unable to substantially interfere with the first plurality of reference receivers and the second plurality of reference receivers simultaneously.

8. The system of claim 7 wherein the processing module is configured to operate the system with data from only one of the first plurality of reference receivers and the second plurality of reference receivers.

9. The system of claim 7 wherein the first plurality of reference receivers is spaced between one and three kilometers from the second plurality of reference receivers.

10. The system of claim 1, further comprising a broadcast module configured to broadcast the measurement corrections and the estimated errors.

11. A method for reducing the effect of interference on a Ground-Based Augmentation System (GBAS), the method comprising:
   receiving satellite data at a plurality of reference receivers, wherein the plurality of reference receivers includes a first subset of reference receivers and a second subset of reference receivers, wherein the first subset of reference receivers are primary reference receivers, wherein a B-value uplink parameter is associated with each of the primary reference receivers, wherein the first subset of reference receivers includes two or more reference receivers, wherein the second subset of reference receivers are substitute reference receivers, wherein the second subset of reference receivers includes at least one reference receiver;
   receiving data at a processing module from the plurality of reference receivers;
   calculating measurement corrections and error estimates from the data; and
   performing at least one of:
      combining a B-value of at least one substitute reference receiver with the B-value of a primary reference receiver in an associated B-value uplink parameter of the primary reference receiver; and
      replacing the B-value of a particular primary reference receiver of the first subset of reference receivers with a B-value from a substitute reference receiver of the second subset of reference receivers in a B-value uplink parameter if the particular primary reference receiver is invalid.

12. The method of claim 11, further comprising processing the data at the processing module to determine if the data is substantially affected by interference, wherein only data that is not substantially affected by interference is used for calculating measurement corrections and error estimates.

13. The method of claim 11, wherein the plurality of reference receivers includes five reference receivers; wherein the first subset of reference receivers includes four reference receivers; and wherein the second subset of reference receivers includes one reference receiver.

14. The method of claim 11, wherein processing the data at the processing module to determine if the data is substantially affected by interference includes determining if noise on the data exceeds a threshold.

15. The method of claim 11, further comprising excluding data from a reference receiver of the plurality of reference receivers if it is determined that the data from the reference receiver is substantially affected by interference.

16. The method of claim 11, further comprising reevaluating whether the particular reference receiver is invalid after a specified time.

17. The method of claim 11, wherein the plurality of reference receivers includes a first plurality of reference receivers and a second plurality of reference receivers;
   wherein the first plurality of reference receivers includes at least three reference receivers;
   wherein the second plurality of reference receivers includes at least three reference receivers; and wherein the first plurality of reference receivers and the second plurality of reference receivers are spaced a distance apart such that a single source of interference is unable to substantially interfere with the first plurality of reference receivers and the second plurality of reference receivers simultaneously.

18. The method of claim 17 wherein the first plurality of reference receivers and the second plurality of reference receivers each include four reference receivers.

19. The method of claim 11, further comprising broadcasting the calculated measurement corrections and error estimates.

20. A processing module, comprising:
a memory;
a storage medium; and
an interference detection module, wherein the interference detection module is configured to:
receive data from a plurality of reference receivers, wherein the plurality of reference receivers includes a first subset of reference receivers that are primary reference receivers; wherein the plurality of reference receivers includes a second subset of reference receivers that are substitute reference receivers, wherein a B-value uplink parameter is associated with each of the primary reference receivers, wherein the first subset of reference receivers includes two or more reference receivers, wherein the second subset of reference receivers includes at least one reference receiver; and
process the data to determine if the data is substantially affected by interference;
a differential correction module, wherein the differential correction module is communicatively coupled to the interference detection module, wherein the differential correction module is configured to calculate measurement corrections and error estimates based on the data that is not substantially affected by interference;
wherein the processing module is configured to perform at least one of:
combining a B-value of a first substitute reference receiver of the second subset of reference receivers with the B-value of a first primary reference receiver of the first subset of reference receivers in an associated B-value uplink parameter of the first primary reference receiver; and
replacing the B-value of a particular primary reference receiver of the first subset of reference receivers with a B-value from a substitute reference receiver of the second subset of reference receivers in a B-value uplink parameter if the particular primary reference receiver is invalid.

21. The processing module of claim 20, wherein the interference detection module is further configured to exclude data from a reference receiver of the plurality of reference receivers if it is determined that the data from the reference receiver is substantially affected by interference.

22. The processing module of claim 21, wherein the data from the reference receiver is substantially affected by interference if noise levels on the data exceed a threshold.

23. The processing module of claim 20, wherein the processing module is further configured to reevaluate whether the particular reference receiver is invalid after a specified time.

* * * * *